Nov. 25, 1952     K. A. KARLSSON     2,618,966
MECHANISM RESPONSIVE TO VARIATIONS IN THE
CONSISTENCY OF A FIBROUS SUSPENSION
Filed June 17, 1947     3 Sheets-Sheet 1
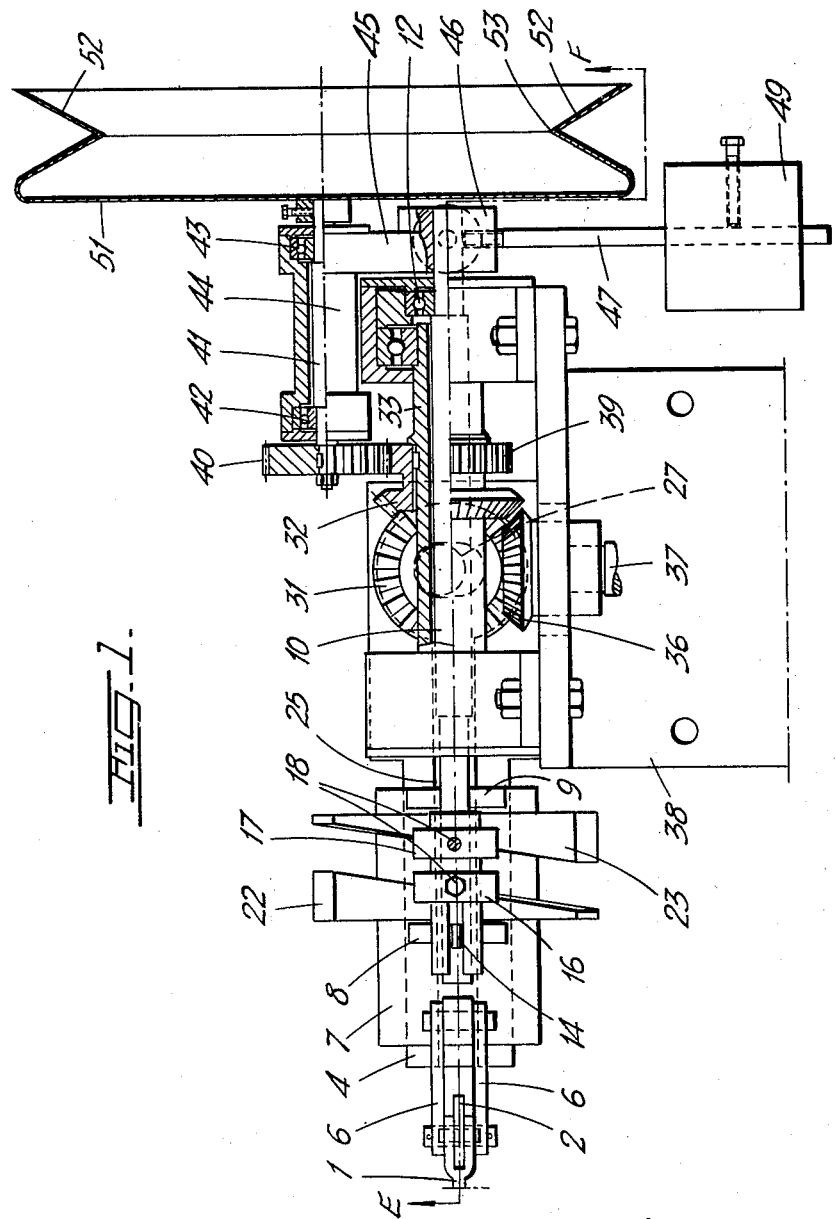
Inventor
Karl Arvid Karlsson
by Sommers + Young
Attorneys

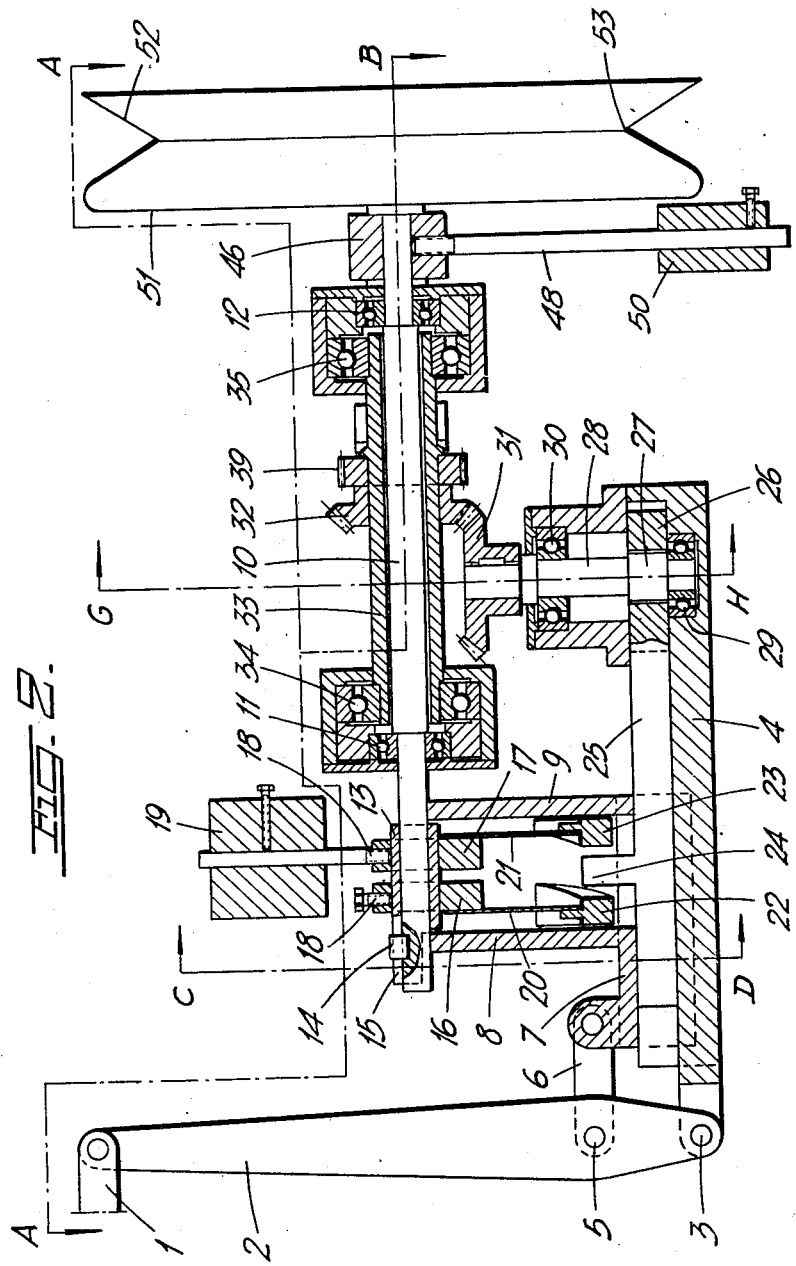

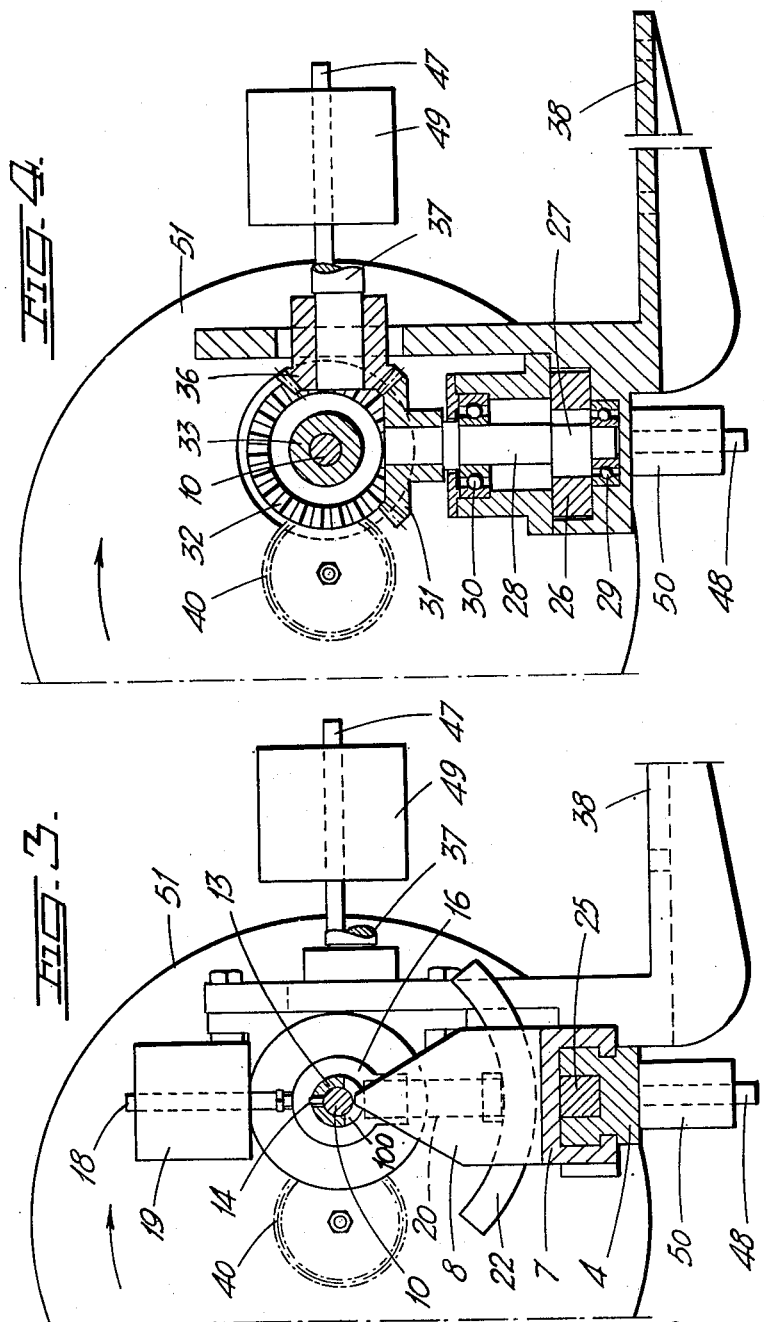

Patented Nov. 25, 1952

2,618,966

UNITED STATES PATENT OFFICE 2,618,966

MECHANISM RESPONSIVE TO VARIATIONS IN THE CONSISTENCY OF A FIBROUS SUSPENSION

Karl Arvid Karlsson, Dals Långed, Sweden

Application June 17, 1947, Serial No. 755,262
In Sweden June 18, 1946

6 Claims. (Cl. 73—54)

This invention relates to mechanism responsive to variations in the consistency of fibrous suspensions. More particularly this invention relates to an apparatus usable for automatically controlling the consistency, such as the concentration, of fibrous suspensions and similar mixtures, especially such as are used in the paper making industry.

According to the invention, a quantity of the suspension to be controlled is introduced, either continuously or intermittently, into an annular or disc-shaped vessel rotating around a horizontal shaft carried by an arm of a balance device, said vessel having an annular overflow opening concentric with its axis of rotation in one of its side walls to determine the quantity of the suspension that may be received by the vessel, said quantity according to its degree of concentration being allowed to move with the vessel through a more or less great angle, thereby changing the total weight of the vessel and content and the position of the center of gravity of the vessel and content, said change being then utilized for effecting the controlling operation. To this end the balance device in one arm of which the shaft of the rotary vessel is mounted is loaded by a pendulum weight so that said change of the total weight and position of the center of gravity of the vessel and its content causes the balance device to make a deviation which is then transformed into a movement of elements for varying the concentration of the suspension. The transmission of said deflection of the balance device to said elements is effected according to an embodiment of the invention through the shaft that supports the balance device. Said shaft may preferably be rigidly connected to the balance device so that it always performs a turning movement corresponding to the deflection of the balance device. Slidably mounted on said shaft is a disc having a curved slot on its periphery or a pair of arched wedges having curved cam surfaces so as to form a curved slot between themselves. Engaging said curved slot is a projection of a mechanically driven member reciprocating within a fixed range. According to the angular position of said disc or said wedges as determined by the angular position of the shaft of the balance device the portion of the curved slot as engaged by said projection will be displaced more or less in the direction of movement of the projection, resulting in a corresponding displacement of the cam disc or wedges. Said lastmentioned displacement is then transmitted by well-known means to the elements for controlling the concentration. It is to be noted that the apparatus need not include any body immersed in the suspension to be controlled but may be entirely disposed outside the container for the suspension at any distance desired therefrom.

In the accompanying drawings an embodiment of the invention is illustrated. Fig. 1 is a plan view, partly in section, on the lines A—A and A—B of Fig. 2. Fig. 2 is a vertical longitudinal section on the line E—F of Fig. 1. Fig. 3 is a vertical cross section on the line C—D of Fig. 2, and Fig. 4 is a vertical cross section on the line G—H of Fig. 2.

In Figs. 1 and 2 the numeral 1 designates part of a member, as a link, for directly or indirectly controlling the element by means of which the regulation of the concentration of the suspension or mixture is effected. Said regulating element may comprise, for instance, a valve for diluting the suspension or means for admitting solid substances to the mixture. Said member 1 is shown in Fig. 2 as connected to the upper end of a vertical lever 2 the lower end of which is hinged by means of the pin 3 to a base portion 4 of the stationary frame of the apparatus. At a point 5 not far from the pin 3 the lever 2 is connected by means of a pair of links 6 to a carriage 7 slidably mounted on the base portion 4. The carriage is provided with a pair of vertical standards 8 and 9 situated at a given distance from each other in the direction of movement of the carriage. The surfaces of the standards facing each other are both perpendicular to the direction of movement of the carriage and, consequently, parallel to each other. The standards 8 and 9 extend upwardly to the neighbourhood of a horizontal shaft 10 yet without touching it. Said shaft 10 extends parallel to the direction of movement of the carriage 7 and may rotate freely in ball bearings 11 and 12 provided in the stationary frame of the apparatus.

In the space between the standards 8 and 9 the horizontal shaft 10 carries a sleeve 13 slidably mounted on the shaft but locked against rotation thereon by means of a key or die 14 secured to the shaft and engaging a longitudinal slot 15 in the sleeve. Said sleeve is also provided with a recess on its lower side, as shown at 169 in Fig. 3, to accommodate the standard 8 and allow turning of the sleeve between given end positions determined by the side surfaces of said recess abutting against the respective side surfaces of the wedge-shaped standard, as will readily be seen from Fig. 3. Fastened to sleeve 13 are two blocks 16 and 17 by means of screws 18 one of which is extended to form a supporting arm for a counterweight 19. Each of the blocks 16 and 17 carries a pendulum comprising a steel band 20 or 21, respectively, and a pendulum weight 22 or 23 attached to the lower end of the respective steel band. The pendulum weights are shaped as arched wedges. Each of them is formed with a plane surface at right angles to the direction of shaft 10 close to the parallel inside of the respective standard 8 or 9. The sides of the wedges facing each other comprise curved cam surfaces intersecting the direction of movement of the carriage 7 under equal oblique angles, which extend parallel to each other so as to form a sort of cam slot between themselves, said cam slot having the same axial width at each point in its length.

The wedge-shaped bodies 22 and 23 may, of course, be replaced by a single member in the shape of a disc having a curved slot in its periphery.

Projecting into the cam slot as formed between the wedge members 22 and 23 is an upwardly extending projection 24 of a slide 25 movable in a direction parallel with the carriage 7 which is guided in a slot formed in the base portion 4 of the frame, as best shown in Fig. 3. Said slide member 25 is exposed at its end facing the lever 2 and is formed at its opposite end with a rounded enlargement or head 26 having a transversely extending slot engaged by an eccentric or cam 27 of a vertical shaft 28 mounted in a ball bearing 29 provided in the base portion 4 and a ball bearing 30 provided in another part of the frame. By this means a reciprocating movement is imparted to the slide 25 on the rotation of shaft 28. The axial distance between the curved cam surfaces of members 22 and 23, that is to say, the axial width of the cam slot between them corresponds to the length of stroke of the slide 25.

The top end of the vertical shaft 28 is connected by bevel gears 31 and 32 to a sleeve 33 concentrically surrounding the shaft 10 along part of its length without being in any direct connection or even contact therewith. Said sleeve 33 is mounted in ball bearings 34 and 35 provided in the frame, as for instance, within the housing containing the ball bearings 11 and 12 for shaft 10 above referred to. The bevel gear 31 meshes also in a bevel gear 36 carried by the shaft 37 of a geared motor, not shown, which is adapted to be mounted on the shelf 38. Secured to the sleeve 33 close by the bevel gear 32 is a cylindrical gear 39 in mesh with a cylindrical gear 40 on a shaft 41 parallel with the shaft 10 and the sleeve 33. Said shaft 41 is mounted by means of ball bearings 42, 43 in a sleeve 44 supported by an arm 45 carried by the shaft 10. Carried by the hub 46 of said arm which surrounds the shaft 10 are two radially projecting arms 47 and 48 the former of which extends in a horizontal direction and the latter in a vertical direction. Each of said arms 47 and 48 supports a counterweight 49 and 50, respectively. Of these counterweights the former, 49, has for its object to balance the arm 45 and sleeve 46, the shaft 41 and associated members, namely, on the one hand, the toothed gear 40 and on the other hand a disc-shaped vessel 51 attached to the end of shaft 41 remote from the toothed wheel 40. Said vessel 51 is open at its side remote from shaft 41 and is provided at its side facing said shaft with a circular bottom and comprises for the rest, a circumferential wall forming an acute angle with said bottom and having a conically widening mouthpiece 52. At the point of transition between the circumferential wall of the vessel and its mouthpiece a circular overflow 53 is obtained. The counterweight 49 is adapted, as already stated, to balance the rotary system the center of rotation of which is the shaft 41. The arm 47 with the counterweight 49 and the arm 45 together with said rotary system forms a balance device the axis of rotation of which is represented by shaft 10. Said balance device is, furthermore, loaded by the pendulum comprising the arm 48 and the weight 50. The pendulum weight 50 is adapted to suppress the tendency of movement of the balance device and makes a more or less great deviation according as the load on the one balance arm or the other is changed.

The operation of the apparatus described is as follows:

From the suspension the concentration of which is to be regulated by means of the apparatus, as for instance a pulp mass, a quantity is taken and introduced, as sprayed, into the vessel 51 while said vessel is rotated at a comparatively high speed transmitted thereto via shaft 41, toothed gearings 40, 39, sleeve 33, toothed gearing 32, 31 and toothed gear 36 with shaft 37 from the motor, not shown, on the shelf 38. From said motor the slide 25 is reciprocated via shaft 37, toothed gear 36, toothed gear 31, shaft 28, cam 27 and head 26. By this reciprocation the projection 24 of slide 25 is reciprocated in the space between the wedge members 22 and 23. Since the wedge members are carried by the slidably mounted sleeve 13 they will be caused by the action of the projection 24 to occupy positions in which their curved cam surfaces are at the exact centers of the projection 24. When thus adjusted the wedges in their turn move the carriage 7 correspondingly. By means of the links 6 the movement of the carriage is transmitted to the lever 2 which causes the member 1 to change the degree of concentration of the suspension by means not shown. Let it be assumed, for instance, that the concentration of the suspension changes, say increases, then the quantity thereof as admitted to the vessel 51 can partake in the rotation of the vessel to a larger degree than before, or so to speak climb higher up on the rising side of the vessel. In such case the quantity of suspension introduced into the vessel 51 adheres better to the peripheral wall of the vessel because of its greater consistency and, consequently, it will be lifted by the rising side of said wall to a higher level. This means that a larger segment of the vessel will be filled with the suspension during the rotation, the vessel with its content becomes heavier and its center of gravity moves to a point more remote from shaft 10. As a result, the balance arm carrying the vessel sinks by a degree determined by the moment of resistance as exerted by the pendulum 48, 50. Said moment may be regulated by adjusting the position of the weight 50. By experiments made prior to the practical use of the apparatus the proper adjustment of the weight may be determined, so that a given variation of the desired degree of concentration causes a deviation of the balanced system sufficient to restore the desired degree of concentration by operation of the lever 2. The operation of said lever for realizing this effect takes place as follows:

When in the case assumed, that is to say, in the case of an increase of the degree of concentration, the balance arm carrying the vessel sunk by a certain degree, the shaft 10 was rotated a corresponding angle in clockwise direction as viewed from the right hand side of Figs. 1 and 2. In the case assumed it is, of course, necessary that the vessel 51 rotates in the direction indicated by the arrows in Figs. 3 and 4 so that the circumferential wall thereof is rising on the side remote from the counterweight 49. By the turning of shaft 10 resulting from the described increase of the concentration the pendulums 20 and 21 together with the wedge members 22 and 23 are turned correspondingly, so that the point of the cam-slot engaged by the projection 24 is moved axially towards the observer in Fig. 2 and downwardly in Fig. 1. By these means the curved cam surface of wedge 22 enters the path of the projection 24 in a greater or less extent depending on the degree of rotation that has taken place, and when the slide 25 moves to the left in Figs. 1 and 2 it will therefore displace the wedge 22 to the left until the point of its curved surface as struck by the projection 24 is stopped at the extreme left hand end of the path of the projection. This axial displacement of wedge 22 brings about a corresponding movement of sleeve 13 together with the pendulum 21, 23 as well as of the standard 8 and the carriage 7. The carriage 7 turns by means of link 6 the lever 2 a certain angle to the left in Fig. 2, and the lever 2 in its turn moves the member 1 for restoring the degree of concentration of the suspension either by an increased admission of liquid thereto or by reducing the admission of solid constituents thereto.

In the apparatus described a very sensible regulation may be obtained, since the balanced system including the rotary vessel and the loading pendulums need not perform any power absorbing functions. This is due to the fact that shaft 10 may move easily in its bearings and that the wedge system 22, 27 may be carefully balanced by the weight 19 so that the turning of the balanced system has only to overcome the very slight resistance that may appear in the ball bearings 11 and 12 and which under all conditions may be a minimum.

With respect to the structure and the mounting of the elements of the system changes may be made without departing from the principle of the invention as defined in the appended claims.

What I claim is:

1. A mechanism responsive to variations in the consistency of a fibrous suspension comprising in combination, a frame structure, a horizontal shaft mounted in said frame structure, a balance device supported by said shaft, an annular vessel for receiving samples of the suspension, a horizontal shaft parallel with said first-mentioned shaft rotatably mounted in one arm of said balance device for supporting said vessel, a gear wheel secured to said vessel-supporting shaft, another gear wheel rotatably mounted on the shaft supporting the balance device for engaging and imparting rotation to said first-mentioned gear wheel, a driving shaft mounted in the frame structure, a gearing system for transmitting rotation from said driving shaft to said other gear wheel for rotating the vessel-supporting shaft in order to allow the sample contained in the vessel to change the moment of the vessel-supporting arm of the balance device by allowing the sample to climb up along the rising side of the vessel in a varying degree depending on the consistency of the suspension, means supported by another arm of the balance device for balancing the weight of said first-mentioned arm and vessel, means secured to the balance device for neutralizing an overbalancing of any arm of the balance device, a carriage slidable parallel to the shaft of the balance device for imparting a setting movement to a regulating member, a stationary guideway in the frame structure, a slide mounted to reciprocate in said guide-way, means for imparting a reciprocating movement of a fixed length of stroke of said slide from the driving shaft, means supported by the shaft of the balance device capable of assuming a position in the path of said slide between it and said carriage for effecting displacement of said carriage in a direction and by an amount which depends on the angular position of the shaft of the balance device.

2. A mechanism as claimed in claim 1, in which the gearing system for transmitting rotation from the driving shaft to the gear wheel rotatably mounted on the balance device supporting shaft includes a shaft at right angles to said balance device supporting shaft and bevel gears connected on the one side with the driving shaft and on the other side with a supporting element of said rotatably mounted gear wheel.

3. A mechanism as claimed in claim 1, characterized by the further feature that the annular vessel rotatably mounted in one arm of the balance device by means of a horizontal shaft comprises a round side wall facing said shaft and rigidly connected thereto in its center a conical peripheral wall tapering from said side wall, and a conical mouth piece widened from the edge of said peripheral wall so as to form a circular overflow bounded by a sharp edge at the joint between the peripheral wall and the mouth piece of the vessel for determining the quantity of suspension that may be received in the vessel.

4. A mechanism as claimed in claim 1 in which the means supported by the shaft of the balance device which project into the path of the slide comprise a pair of wedge-shaped members forming a cam slot between themselves, into which cam slot a projection of the slide engages for displacing said wedge-shaped members in one direction or the other according to the angular position of the shaft of the balance device and the wedge-shaped members carried thereby, said wedge-shaped members being on their sides remote from the cam slot guided by surfaces of the carriage extending at right angles to the shaft so as to impart a movement to said carriage in accordance with the movement imparted to the wedge-shaped members by the projection of the slide.

5. A mechanism as claimed in claim 4, characterized by the further feature that the wedge-shaped members are carried by a sleeve slidably but not rotatably mounted on the shaft of the balance device, the connection between said sleeve and said wedge-shaped members comprising steel bands, so that the wedges are caused to move in common during rotation of said shaft for displacing the cam slot in the longitudinal direction of the shaft, the wedge-shaped members being situated with their surfaces remote from the cam slot adjacent surfaces of the slidable means for imparting setting movement to the regulating member, the steel bands being flexible so as to allow the wedges to be pressed against said surfaces of the slidable means when the wedges are displaced by the action of the power driven means.

6. A mechanism as claimed in claim 4, and in which the members forming the cam slot are separately balanced by a counterweight.

KARL ARVID KARLSSON.

REFERENCES CITED

The following references are of record in the file of this patent:

UNITED STATES PATENTS

| Number | Name | Date |
| --- | --- | --- |
| 1,178,193 | Trimbey | Apr. 4, 1916 |
| 1,544,705 | Wallace | July 7, 1925 |
| 1,810,111 | Meyers | June 16, 1931 |
| 1,944,243 | Kegl | Jan. 23, 1934 |
| 1,966,638 | Morgan | July 17, 1934 |
| 2,017,225 | Witham | Oct. 15, 1935 |
| 2,273,750 | Clagett | Feb. 17, 1942 |
| 2,280,632 | Cram | Apr. 21, 1942 |
| 2,372,595 | Maxon | Mar. 27, 1945 |
| 2,442,888 | Cram | June 8, 1948 |